R. H. BARR.
COOKING UTENSIL.
APPLICATION FILED DEC. 3, 1915.
1,192,730.　　　　　　　　　　　　Patented July 25, 1916.
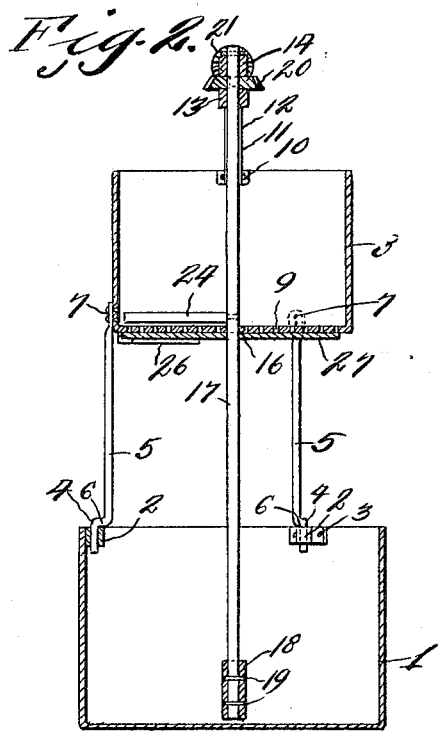
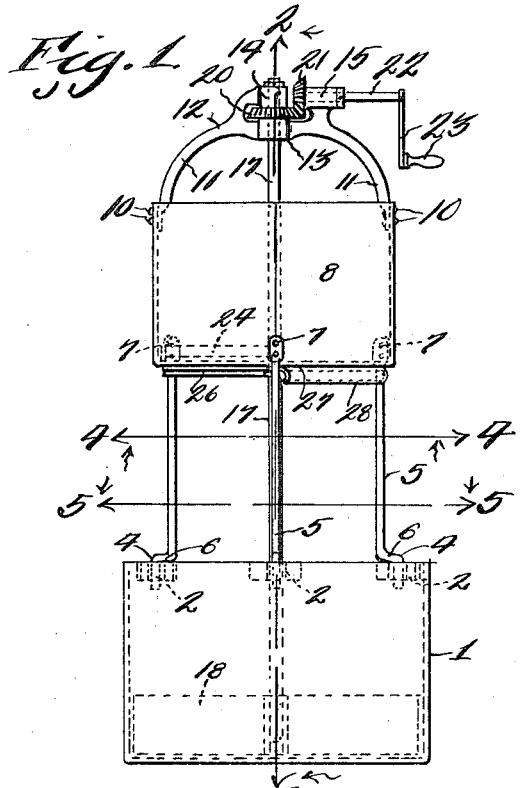
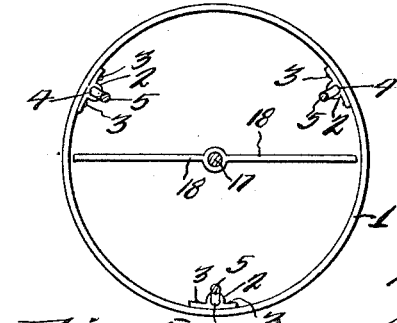
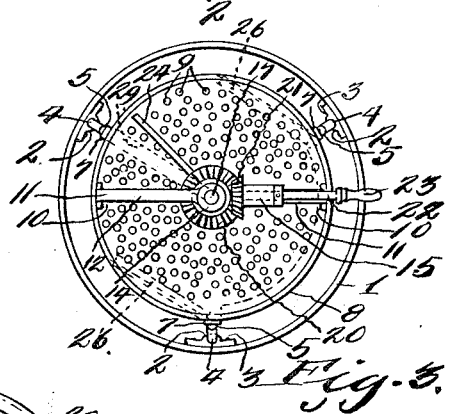
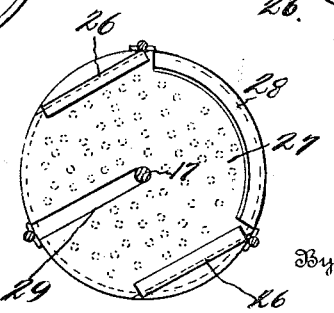
Inventor
R. H. Barr
By D. Swift & Co.
his Attorneys

UNITED STATES PATENT OFFICE.

ROBERT H. BARR, OF CARROLLS, WASHINGTON.

COOKING UTENSIL.

1,192,730.  Specification of Letters Patent.  Patented July 25, 1916.

Application filed December 3, 1915.  Serial No. 64,900.

*To all whom it may concern:*

Be it known that I, ROBERT H. BARR, a citizen of the United States, residing at Carrolls, in the county of Cowlitz, State of Washington, have invented a new and useful Cooking Utensil; and I do hereby declare the following to be a full, clear, and exact description of the invention, such as will enable others skilled in the art to which it appertains to make and use the same.

This invention relates to the art of cooking utensils, and particularly to a device of this nature for cooking mush.

It has been found in cooking mush (which is, as a rule of a thick consistency) it frequently burns and becomes lumped, if not properly attended to, for instance, if not thoroughly agitated while being cooked.

Therefore, one of the objects of the present invention is to provide a cooking utensil consisting of two receptacles, an upper one in which the meal is carried, and a lower one for containing water in boiling action, into which the meal gradually falls or descends from the upper receptacle, in combination with agitating means in the lower receptacle, for thoroughly agitating the water, and the meal as it deposits therein, so as to prevent the meal from burning and becoming lumped.

Another object of the invention is to provide means in the upper receptacle for agitating the meal, to cause the same to easily sieve through the perforations of the upper receptacle.

Another object of the invention is to provide means for cutting off the meal in its flow from the upper receptacle.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of the improved cooking utensil. Fig. 2 is a vertical sectional view. Fig. 3 is a top plan view. Fig. 4 is a sectional view on line 4—4 of Fig. 1 looking upwardly. Fig. 5 is a sectional view on line 5—5 of Fig. 1 looking downwardly.

Referring more especially to the drawings, 1 designates the lower receptacle, in which the water to be boiled is placed. Mounted in brackets 2 (which are secured at 3 to the wall of the receptacle 1) are the offset ends 4 of the rods 5. The ends 4 are offset, to form shoulders 6 engaging the upper edges of the brackets 2, to prevent the rods 5 from telescoping or passing too far through the brackets 2. The upper ends of the rods 5 are riveted or otherwise suitably secured at 7 adjacent the lower part of the wall of the upper receptacle 8, the bottom of which is provided with perforations 9. The upper receptacle 8 is designed to receive the corn meal or the like, which is adapted to sift through the perforations 9. Secured at 10 to diametrically opposite portions of the upper part of the wall of the receptacle 8 are the arms 11 of the supporting bracket 12, which is provided with three bearings 13, 14 and 15. Mounted in the bearings 13 and 14 and in a bearing 16 of the bottom of the receptacle 8 is a revoluble shaft 17, at the extreme lower end of which an agitator or paddle 18 is secured, as shown at 19. The shaft 17 as it rotates causes the agitator to agitate the water and the meal, and prevents the mush from becoming burnt and lumpy. The upper end of the shaft 17 is provided with a beveled gear 20, which is in mesh with the beveled gear 21 of the shaft 22, which is mounted in a bearing 15. The shaft 22 is supplied with a crank and handle 23, whereby revoluble movement may be imparted to the shaft 22, which in turn, through the medium of the gears 20 and 21, imparts movement to the shaft 17. The shaft 17 is supplied with a laterally extending arm 24, designed to swing in a horizontal plane just a little above the upper surface of the perforated bottom of the receptacle 8, so as to thoroughly agitate the meal, and cause it to thoroughly and properly sieve through the perforations gradually yet steadily, and which meal as it enters the water in the receptacle 1 becomes thoroughly cooked, and owing to the provision of the agitator 18 will not burn or become lumpy. The bottom of the receptacle 8 is provided with a pair of diametrically opposite guides 26, to receive a slide 27, for cutting off the corn meal by closing the perforations 9. The slide 27 at one side is formed with a downwardly extending partially curved flange 28 to be grasped by the operator, when it is desired that the slide be removed. The slide 27 is formed with a slot 29, to receive or arch the shaft 17, as the slide is inserted in place.

The invention having been set forth, what is claimed as new and useful is:

In a cooking utensil for cooking mush and the like, the combination of a pair of receptacles, one disposed concentrically spaced apart above the other, supporting rods secured to the sides of the upper receptacle and having shouldered lower portions, the lower receptacle having bearings to receive said shouldered lower portions, the upper receptacle having perforations in its bottom, a vertical shaft mounted in bearings of the upper receptacle and extending axially therethrough and having an agitator at its lower extremity movable adjacent the bottom of the lower receptacle, means for imparting motion to said shaft, an agitator arm on said shaft and adapted to move with the shaft so as to sweep adjacent the upper surface of the perforated bottom to agitate the meal causing it to sieve through the perforations, the bottom of the upper receptacle having guides, and a slide mounted in the guides for closing the perforations.

In testimony whereof I have signed my name to this specification in the presence of two subscribing witnesses.

ROBERT H. BARR.

Witnesses:
C. C. RULIFSON,
H. G. RULIFSON.

Copies of this patent may be obtained for five cents each, by addressing the "Commissioner of Patents, Washington, D. C."